Figure 1:
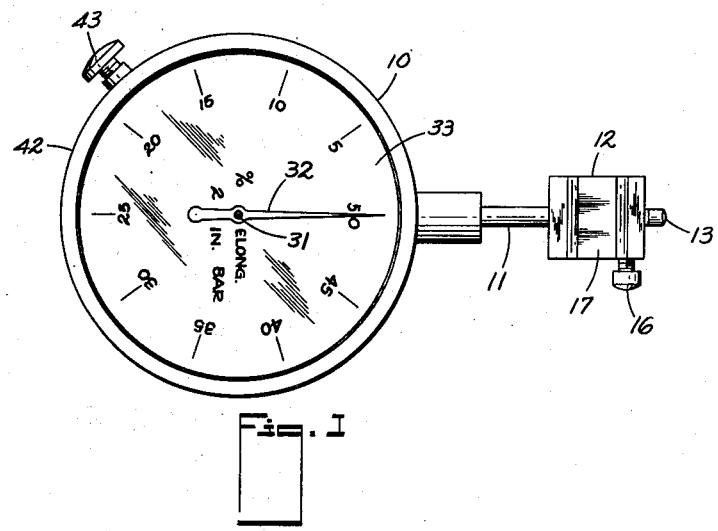

Sept. 22, 1953 J. E. MICKSCH 2,652,631
ELONGATION INDICATOR

Filed March 15, 1951 2 Sheets-Sheet 1

*INVENTOR.*
JOSEPH E. MICKSCH
BY
*Richey Watts*
ATTORNEYS

Sept. 22, 1953　　　J. E. MICKSCH　　　2,652,631
ELONGATION INDICATOR

Filed March 15, 1951　　　　　　　　　　　2 Sheets-Sheet 2

INVENTOR.
JOSEPH E. MICKSCH
BY
*Richey & Watts*
ATTORNEYS

Patented Sept. 22, 1953

2,652,631

UNITED STATES PATENT OFFICE 2,652,631

ELONGATION INDICATOR

Joseph E. Micksch, Ashtabula, Ohio, assignor to The Lake City Malleable Company, Cleveland, Ohio, a corporation of Ohio Application March 15, 1951, Serial No. 215,820

4 Claims. (Cl. 33—147)

This invention relates to measuring apparatus and more particularly to gauging apparatus or providing a direct reading of the percent elongation of test bars.

In connection with the determination of the physical properties of various metals and their alloys, it is sometimes practical to form what is known as a test bar having a section of uniform known diameter. Punch marks are placed on this section spaced by a known standard distance. For example, the test bar may have a reduced portion ⅝" in diameter with punch marks thereon spaced 2" apart. The bars are then placed in a test machine and stretched until they break, the tension applied to the bars being noted during the process.

It is usually desired to determine the percent elongation of the metal after breakage and it is a primary object of this invention to facilitate this determination. Heretofore the percent of elongation has been found by adjusting a pair of dividers or the like with one hand while holding the broken bar with its parts brought together again in the other hand or in a vise, thereby fitting the calipers or dividers to the new or elongated spacing of the punch marks. The dividers are then layed against a graduated scale and the new spacing thereof determined. If the scale is not a decimal scale, the reading must be converted to decimals. The original spacing of the marks (2" in this example) is then subtracted from the final spacing to give the elongation, which in turn is divided by the initial spacing to give the percent elongation. It is a feature and advantage of this invention that the latter figure is obtained instantly by manipulation of applicant's improved apparatus with one hand.

Within the preferred form of the invention, this is accomplished by providing an indicator of the dial or pointer type having a pair of probes for one-handed adjustment to the punch marks on the test specimen, which the indicator is calibrated to read (for a given specified test specimen) the percent elongation directly. The preferred form of the invention is in the form of a dial indicator having a slide, the body being arranged to be gripped in the palm of the hand with means on the slide for manipulation of the latter by the index finger. The slide is friction-loaded and so remains in its adjusted position while the reading is taken. The manner in which these and other objects and advantages may be practiced will be apparent in the following detailed description of the preferred embodiment of the invention.

Figure 2:
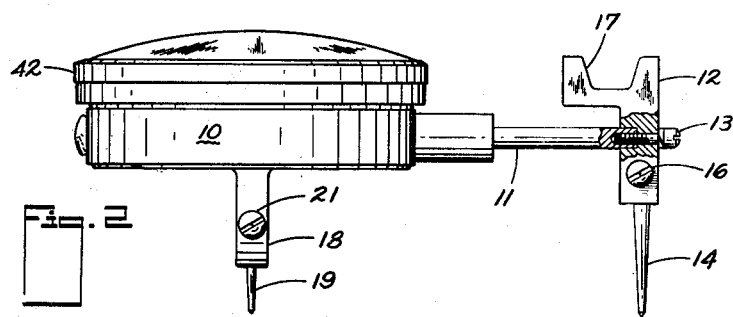
Figure 3:
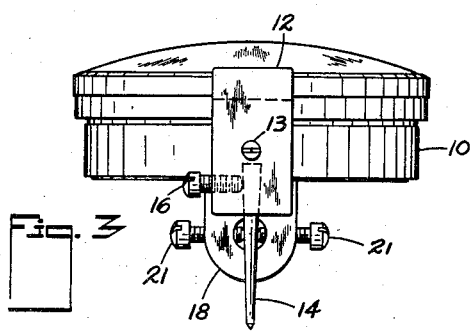
Figure 4:
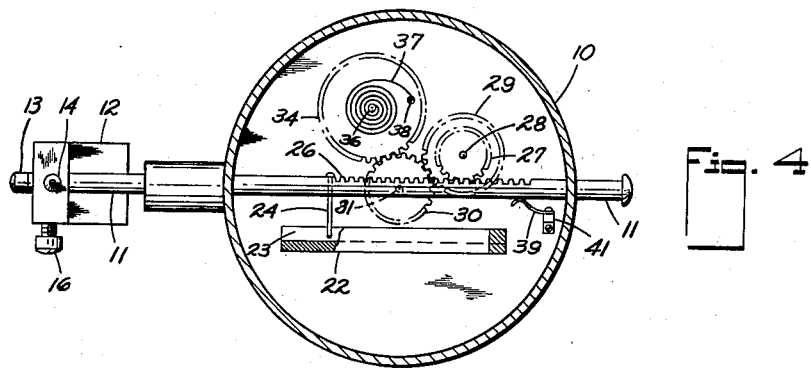
Figure 5:
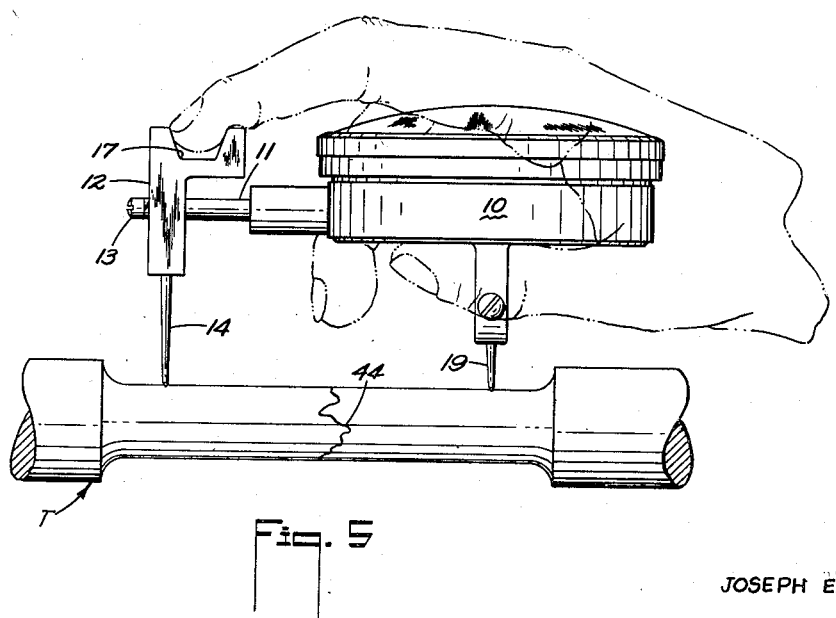

In the drawings:

Fig. 1 is a plan view of the device;
Fig. 2 is a side view thereof;
Fig. 3 is an end view thereof;
Fig. 4 shows the interior mechanism; and
Fig. 5 illustrates how the device is held in the hand.

In the preferred form of the invention a dial type indicator is used having a casing 10 which slidably mounts a slide or plunger 11. Fastened to the end of the plunger is a finger piece 12 secured by a suitable screw 13 and mounting a hardened metal probe 14 by means of another screw 16. The finger piece 12 is notched or relieved as at 17 for reception of the end of the forefinger. The other probe is mounted in an ear 18 extending from the casing 10 and includes a hardened metal point 19 held in place by screws 21.

Referring to Fig. 4, suitable interior mechanism is herein disclosed. A bar 22 is fastened to the casing, the bar being notched as at 23 to slidably receive a pin 24 mounted in the plunger 11. This construction prevents rotation of the plunger. Rack teeth 26 are machined on one side of the plunger and mesh with a pinion 27 keyed to shaft 28 which is in turn keyed to a gear 29. Gear 29 meshes with gear 30 which turns the pointer shaft 31 and mounts the pointer 32 (seen in Fig. 1). In order to take the lost motion out of the gearing in one direction thereby eliminating differences in readings due to lost motion, a lost motion take up gear 34 is pivotally mounted on fixed shaft 36 there being a spiral hair-spring 27 fastened to the shaft and to the take up gear as at 38.

The plunger 11 is held frictionally in its set position by suitable means such as a leaf spring 39 mounted on a body-carried spring post 41 and resiliently engaging the plunger 11. The friction resistance offered by the friction device to move the plunger exceeds the force of the hair-spring 37 so that the latter may not move the plunger but may only serve to take up free or lost motion of the gears in one direction.

A dial 33 (Fig. 1) is calibrated to read percent elongation directly in conjunction with the pointer. In order to provide a zero setting, the dial may be adjusted by means of bezel 42 and the assembly locked with a suitable clamp screw 43.

Typical dimensions and calibrations of the instrument will be set forth in connection with the device intended for use with 2" test specimens. In the form shown, the diameter of the casing is 2" or more although this dimension is not critical. The total range of motion of the plunger of the movable probe 14 will be slightly in excess of 1″ so that maximum elongation readable on the dial will be 50% representing 1″ plunger motion with respect to a 2″ test specimen. Under these conditions, the minimum spacing of the probes should be slightly less than 2″ and their maximum spacing slightly more than 3″ whereupon full-scale deflection of the instrument may be utilized. In other words, the gear ratios will be so selected under the substances that 1″ plunger motion will produce one revolution of the pointer 32.

Manipulation of the device will be readily understood from Fig. 5. The test specimen T, which was fractured as at 44, is in any suitable manner held so that the fractured portions are restored to their original positions. The casing 10 is then held in the palm of the hand and the forefinger is placed in a groove 17 of the block 12. The body probe 19 is fitted to one of the punch marks (which were originally 2″ apart in the example) and the movable probe 14 fitted to the other punch mark by manipulation of the forefinger. This motion is readily and quickly accomplished without need for practice or skill on the part of the user. If the instrument is calibrated in accordance with considerations given, the pointer and dial will at once indicate the percent elongation of the test specimen. The adjusted position of the apparatus will be maintained by the friction device such as leaf spring 39, while the reading is noted and recorded. The friction device 39 need only be strong enough to hold the plunger against vibration or jarring and the hair-spring 37, which is readily overcome because it is relatively weak. Although the dial type of indicator is the most readily manipulated type of device for this purpose, the broader aspect of the invention, a lever type indicator, may be useful for the same purpose.

The calibration of the instrument for a given test specimen is arrived at from the following expression:

$$\frac{P}{L} = \frac{E}{100}$$

where

P = Plunger travel to give full scale deflection,
L = Initial gauge length of test specimen, and
E = Percent elongation at full scale deflection.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A direct reading per cent elongation indicator for use on test specimens having gauge marks spaced by a given initial distance, said indicator comprising a casing, a plunger slidably projecting from said casing, a dial and a pointer therefor mounted on said casing, step-up gearing in said casing connecting said plunger to said pointer, resilient friction means in said casing and engaging said plunger, a pointed probe fixed to said frame means for placement in one gauge mark, a pointed probe mounted on said plunger for placement in the other gauge mark, said dial being calibrated to read the percentage increase in probe spacing over the initial spacing.

2. A direct reading per cent elongation indicator for use on test specimens having gauge marks spaced by a given initial distance, said indicator comprising a casing, a plunger slidably projecting from said casing, a dial and a pointer therefor mounted on said casing, step-up gearing in said casing connecting said plunger to said pointer, resilient friction means in said casing and engaging said plunger, a pointed probe fixed to said frame means for placement in one gauge mark, a recessed finger-receiving block mounted on the end of said plunger, a pointed probe mounted on said block for placement in the other gauge mark, said dial being calibrated to read the percentage increase in probe spacing over the initial spacing.

3. A direct reading per cent elongation indicator for use on test specimens having gauge marks spaced by a given initial distance, said indicator comprising frame means, a plunger slidably projecting from said frame means, a dial and a pointer therefor mounted on said frame means, motion-multiplying mechanism connecting said plunger to said pointer, a pointed probe extending from the under side of said frame means for placement in one gauge mark, a block mounted on the upper end of said plunger having a recess in the topside thereof for reception of the end of a human finger, a pointed probe mounted on said finger block and extending from the under side thereof for placement in the other gauge mark, said dial being calibrated to read the percentage increase in probe spacing over the initial spacing.

4. A direct reading per cent elongation indicator for use on test specimens having gauge marks spaced by a given initial distance, said indicator comprising frame means, a plunger slidably projecting from said frame means, a dial and a pointer therefor mounted on said frame means, motion-multiplying mechanism connecting said plunger to said pointer, friction means on said frame means for frictionally causing said plunger to remain in a given position, a pointed probe extending from the under side of said frame means for placement in one gauge mark, a block mounted on the upper end of said plunger having a recess in the topside thereof for reception of the end of a human finger, a pointed probe mounted on said finger block and extending from the under side thereof for placement in the other gauge mark, said dial being calibrated to read the percentage increase in probe spacing over the initial spacing.

JOSEPH E. MICKSCH.

References Cited in the file of this patent

UNITED STATES PATENTS

| Number | Name | Date |
| --- | --- | --- |
| 925,814 | Jones | June 22, 1909 |
| 1,300,790 | Tretch | Apr. 15, 1919 |
| 1,382,663 | Metzger | June 28, 1921 |
| 1,465,583 | Miley | Aug. 21, 1923 |
| 2,287,273 | Rabb | June 23, 1942 |

FOREIGN PATENTS

| Number | Country | Date |
| --- | --- | --- |
| 700,371 | France | Dec. 13, 1930 |